(12) United States Patent
Chen (10) Patent No.: US 10,686,477 B2
(45) Date of Patent: Jun. 16, 2020

(54) METHOD AND APPARATUS FOR ELIMINATING INTERFERENCE SIGNAL

(71) Applicant: BEIJING XIAOMI MOBILE SOFTWARE CO., LTD., Beijing (CN)

(72) Inventor: Chaoxi Chen, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/205,346

(22) Filed: Nov. 30, 2018

(65) Prior Publication Data

US 2019/0165822 A1 May 30, 2019

(30) Foreign Application Priority Data

Nov. 30, 2017 (CN) .......................... 2017 1 1241196

(51) Int. Cl.
*H04B 1/12* (2006.01)
*H04B 1/525* (2015.01)

(52) U.S. Cl.
CPC ............... *H04B 1/12* (2013.01); *H04B 1/525* (2013.01)

(58) Field of Classification Search
None
See application file for complete search history.

(56) References Cited

U.S. PATENT DOCUMENTS

| 7,457,586 B1 * | 11/2008 | Hietala | H03F 1/3258 |
| | | | 375/296 |
| 2006/0098765 A1 * | 5/2006 | Thomas | H04B 1/525 |
| | | | 375/346 |
| 2007/0015468 A1 | 1/2007 | Kouki et al. | |
| 2009/0318093 A1 * | 12/2009 | Prikhodko | G01R 31/2837 |
| | | | 455/73 |
| 2017/0054472 A1 * | 2/2017 | Zhang | H04B 3/238 |
| 2017/0104574 A1 | 4/2017 | Hahn et al. | |
| 2017/0353200 A1 * | 12/2017 | Shen | H03F 3/24 |
| 2018/0241301 A1 * | 8/2018 | Nagaoka | B60L 53/12 |
| 2019/0199135 A1 * | 6/2019 | Nagaoka | H02J 50/12 |

OTHER PUBLICATIONS

European Search Report dated Feb. 12, 2019 in EP Appl. No. 18208872.4.

* cited by examiner

*Primary Examiner* — Lana N Le
(74) *Attorney, Agent, or Firm* — Syncoda LLC; Feng Ma (57) ABSTRACT

A method for reducing or eliminating an interference signal includes: coupling a transmission signal transmitted from a transmission antenna of a communication device so as to obtain a reference signal; adjusting a power and a phase of the reference signal, superimposing a cancellation signal obtained by the adjusting with a received signal received by a reception antenna of the communication device, and coupling the obtained superposition signal so as to obtain an acquisition signal; and repeating the adjusting until a voltage value of the acquisition signal is smaller than or equal to a historical minimum voltage value, the received signal including a useful signal and an interference signal formed by the transmission signal at the reception antenna; and determining the obtained superposition signal as a received signal for eliminating interference of the receive antenna, the received signal for eliminating interference of the receive antenna including the useful signal.

10 Claims, 6 Drawing Sheets

METHOD AND APPARATUS FOR ELIMINATING INTERFERENCE SIGNAL

CROSS-REFERENCE TO RELATED APPLICATIONS

The present application claims priority to Chinese Patent Application No. 201711241196.3 filed Nov. 30, 2017, the entire contents of which are incorporated herein by reference.

BACKGROUND

The fifth generation of mobile communications (5G) is approaching. Technologies such as Full-duplex, Multiple-Input Multiple-Output (MIMO), and Orthogonal Frequency Division Multiplexing (OFDM) will be widely used in 5G communications.

SUMMARY

The present disclosure relates to the technical field of communication devices, and more specifically, to a method and apparatus for reducing or eliminating an interference signal.

Various embodiments of the present disclosure provide a method and apparatus for reducing or eliminating an interference signal.

According to a first aspect of the embodiments of the present disclosure, there is provided an apparatus for eliminating an interference signal, including: a first coupler, an adjusting portion, a combiner, a second coupler, and a control portion, wherein:

the first coupler is coupled to a transmission antenna of a communication device, and is configured to couple a transmission signal transmitted by the transmission antenna of the communication device so as to obtain a reference signal;

the adjusting portion is coupled to the first coupler and is configured to adjust a power and a phase of the reference signal to obtain a cancellation signal;

the combiner is coupled to the adjusting portion and a reception antenna of the communication device respectively, and is configured to superimpose the cancellation signal obtained by the adjustment with a received signal received by the reception antenna of the communication device to obtain a superposition signal, the received signal comprising a useful signal and an interference signal formed by the transmission signal at the reception antenna;

the second coupler is coupled to the combiner and is configured to couple the obtained superposition signal so as to obtain an acquisition signal; and the control portion is coupled to the second coupler and the adjusting portion respectively, and is configured to control the adjusting portion to adjust the power and the phase of the reference signal according to a voltage value of the acquisition signal until the voltage value of the acquisition signal is small than or equal to a historical minimum voltage value; and determine the obtained superposition signal as a received signal for eliminating interference of the reception antenna, the received signal for eliminating interference comprising the useful signal.

In some embodiments, the adjusting portion includes: a phase shifter and a power controller, wherein:

the phase shifter is configured to adjust the phase of the reference signal; and the power controller is coupled to the phase shifter and is configured to adjust the power of the reference signal.

In one embodiment, the control portion includes: a detector, an analog-to-digital converter, and a processor, wherein:

the detector is configured to convert the acquisition signal into a voltage signal;

the analog-to-digital converter is coupled to the detector and is configured to convert the voltage signal into a digital signal; and the processor is coupled to the analog-to-digital converter and the adjusting portion, and is configured to control the adjusting portion to adjust the power and the phase of the reference signal according to the digital signal until a voltage value of the voltage signal is smaller than or equal to a historical minimum voltage value; and determine the superposition signal obtained by the combiner as the received signal for eliminating interference of the reception antenna comprising the useful signal.

In one embodiment, the interference signal includes a self-interference signal or a mutual interference signal.

According to a second aspect of the embodiments of the present disclosure, there is provided a method for eliminating an interference signal, including:

coupling a transmission signal transmitted from a transmission antenna of a communication device so as to obtain a reference signal;

adjusting a power and a phase of the reference signal, superimposing a cancellation signal obtained by the adjustment with a received signal received by a reception antenna of the communication device, and coupling the obtained superposition signal so as to obtain an acquisition signal; and repeating this step until a voltage value of the acquisition signal is smaller than or equal to a historical minimum voltage value, the received signal comprising a useful signal and an interference signal formed by the transmission signal at the reception antenna; and determining the obtained superposition signal as a received signal for eliminating interference of the receive antenna, the received signal for eliminating interference of the receive antenna comprising the useful signal.

In one embodiment, the interference signal includes a self-interference signal or a mutual interference signal.

In one embodiment, the adjusting the power and the phase of the reference signal includes:

adjusting the power and the phase of the reference signal according to a voltage value of the acquisition signal.

According to a third aspect of the embodiments of the present disclosure, there is provided an apparatus for eliminating an interference signal, including:

a coupling module configured to couple a transmission signal transmitted by a transmission antenna of a communication device so as to obtain a reference signal;

an adjusting portion configured to adjust a power and a phase of the reference signal, superimpose a cancellation signal obtained by the adjustment with a received signal received by a reception antenna of the communication device, and couple the obtained superposition signal so as to obtain an acquisition signal; and repeat this step until a voltage value of the acquisition signal is smaller than or equal to a historical minimum voltage value, the received signal comprising a useful signal and an interference signal formed by the transmission signal at the reception antenna; and a determining module configured to determine the obtained superposition signal as a received signal for eliminating interference of the receive antenna, the received signal for eliminating interference of the receive antenna comprising the useful signal.

In one embodiment, the interference signal includes a self-interference signal or a mutual interference signal.

In one embodiment, the adjusting portion is configured to adjust the power and the phase of the reference signal according to a voltage value of the acquisition signal.

According to a fourth aspect of the embodiments of the present disclosure, there is provided an apparatus for eliminating an interference signal, including:

a processor;

memory for storing instructions executable by the processor;

wherein the processor is configured to:

couple a transmission signal transmitted from a transmission antenna of a communication device so as to obtain a reference signal;

adjust a power and a phase of the reference signal, superimpose a cancellation signal obtained by the adjustment with a received signal received by a reception antenna of the communication device, and couple the obtained superposition signal so as to obtain an acquisition signal; and repeat this step until a voltage value of the acquisition signal is smaller than or equal to a historical minimum voltage value, the received signal comprising a useful signal and an interference signal formed by the transmission signal at the reception antenna; and determine the obtained superposition signal as a received signal for eliminating interference of the receive antenna, the received signal for eliminating interference of the receive antenna comprising the useful signal.

According to a fifth aspect of the embodiments of the present disclosure, there is provided a computer readable storage medium having computer instructions stored thereon, wherein the instructions are executed by a processor to implement the steps of any of the above method embodiments in the above second aspect.

It is to be understood that both the foregoing general description and the following detailed description are exemplary and explanatory only and are not restrictive of the present disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Various embodiments of the present disclosure are described below with specific examples, and other advantages and effects of the present disclosure can be easily understood by those skilled in the field of technology from the contents disclosed in this specification. The following description refers to the accompanying drawings in which same numeral references in different drawings may represent the same or similar elements unless otherwise indicated.

Apparently, the described embodiments are only a part of embodiments in the present disclosure, rather than all of them. The present disclosure can also be implemented or applied through different specific embodiments, and various details of the specification can also be modified or changed based on different viewpoints and applications without departing from the spirit of the present disclosure.

The inventors of the present disclosure have recognized that, in the case of using the MIMO technology, signal self-interference and mutual interference problems exist between multi-transmitting signals and multi-receiving signals of a communication device using the full-duplex communication; and the existence of the self-interference signals and the mutual interference signals may seriously affect the communication quality of the communication device, resulting in that the communication device cannot receive signals and send signals normally, which seriously restricts and affects the user experience of the communication device.

Figure 1:
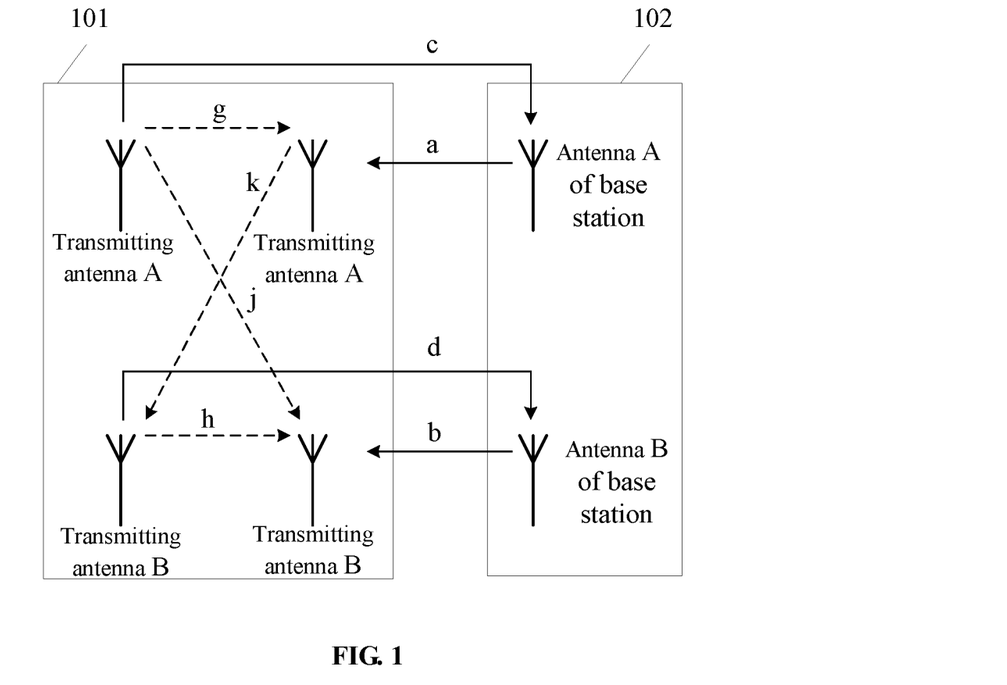
FIG. 1 is a schematic diagram illustrating that a terminal has an interference signal according to some embodiments.

A terminal is used as the communication device for an example. FIG. 1 is a schematic diagram illustrating that an interference signal exists in the terminal using 2×2 MIMO technology.

As shown in FIG. 1, an antenna of a MIMO-based terminal transmits multiple signals and receives multiple signals. Signals a and b are information received by a reception antenna A and a reception antenna B of a terminal 101 from a MIMO-based 5G base station 102 respectively; and signals c and d are information sent to the base station 102 by a transmission antenna A and a transmission antenna B respectively, which is an expected communication way between the terminal 101 and the base station 102. However, since the MIMO-based 5G communication terminal has multiple-input multiple-output antennas and the transmission antenna and the reception antenna are on the same terminal, the signal c sent by the transmission antenna A of the terminal 101 to the base station 102 may be received by the antenna A of the base station 102, and meanwhile it may generate a self-interference signal g at the reception antenna A of the terminal 101 and a mutual interference signal j at the reception antenna B.

Similarly, the useful signal d transmitted by the transmission antenna B of the terminal 101 to the base station may be received by the antenna B of the base station 102, and meanwhile it may generate a mutual interference signal k at the reception antenna A of the terminal 101 and a self-interference signal h at the reception antenna B. It may be seen that the existence of the self-interference signals g and h and the mutual interference signals j and k seriously affect the communication quality of the terminal, causing the terminal to fail to receive information and send information normally.

In order to solve the above problems, some embodiments of the present disclosure provide an apparatus configured to reduce or eliminate an interference signal, including: a first coupler, an adjusting portion, a combiner, a second coupler, and a control portion.

In some embodiments, the first coupler is coupled to a transmission antenna of a communication device, and is configured to couple a transmission signal transmitted by the transmission antenna of the communication device so as to obtain a reference signal; the adjusting portion is coupled to the first coupler and is configured to adjust a power and a phase of the reference signal to obtain a cancellation signal; the combiner is coupled to the adjusting portion and a reception antenna of the communication device respectively, and is configured to superimpose the cancellation signal obtained by adjustment with a received signal received by the reception antenna of the communication device to obtain a superposition signal, the received signal including a useful signal and an interference signal formed by the transmission signal at the reception antenna; the second coupler is coupled to the combiner and is configured to couple the obtained superposition signal so as to obtain an acquisition signal; and the control portion is coupled to the second coupler and the adjusting portion respectively, and is configured to control the adjusting portion to adjust the power and the phase of the reference signal according to a voltage value of the acquisition signal until the voltage value of the acquisition signal is small than or equal to a historical minimum voltage value; and determine the obtained superposition signal as a received signal for eliminating interference of the reception antenna, the received signal for eliminating interference including the useful signal.

The various device components, blocks, or portions may have modular configurations, or are composed of discrete components, but nonetheless may be referred to as "modules" in general. In other words, the "modules" referred to herein may or may not be in modular forms.

By adjusting the power and the phase of the reference signal, which is obtained by coupling the transmission signal, the cancellation signal can suppress and eliminate the interference signal formed at the reception antenna by the transmission signal, so as to ensure that the communication device can normally receive and transmit the received information and the transmitted information, solve the problem of signal self-interference and mutual interference between the multi-transmitting signals and the multi-receiving signals of the communication device adopting full-duplex communication, improve the communication quality of the communication device, and improve the user experience.

Based on the above analysis, the following specific embodiments can be described in more detail.

Figure 2:
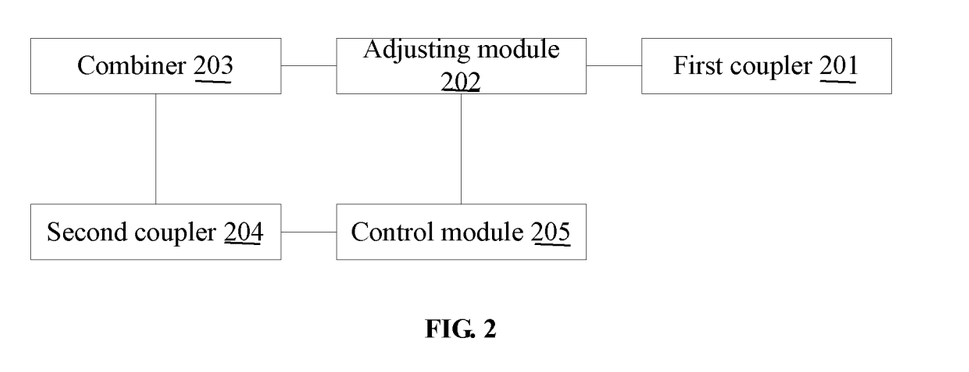
FIG. 2 is a block diagram of an apparatus for eliminating an interference signal according to some embodiments.

FIG. 2 is a block diagram of an apparatus for eliminating an interference signal according to some embodiments. As shown in FIG. 2, the apparatus for eliminating an interference signal includes a first coupler 201, an adjusting portion 202, a combiner 203, and a second coupler 204, and a control portion 205.

The first coupler 201 is coupled to a transmission antenna of a communication device, and is used for coupling a transmission signal transmitted by the transmission antenna of the communication device so as to obtain a reference signal.

The adjusting portion 202 is coupled to the first coupler 201 for adjusting a power and a phase of the reference signal to obtain a cancellation signal.

The combiner 203 is coupled to the adjusting portion 202 and a reception antenna of the communication device respectively, and is used for superimposing the cancellation signal obtained by the adjustment with the receiving signal received by the reception antenna of the communication device to obtain a superposition signal; wherein the received signal includes a useful signal and an interference signal formed by the transmitting signal at the reception antenna.

The second coupler 204 is coupled to the combiner 203 for coupling the obtained superposition signal so as to obtain an acquisition signal.

The control portion 205 is coupled to the second coupler 204 and the adjusting portion 202 respectively, and is used for controlling the adjusting portion 202 to adjust the power and the phase of the reference signal according to a voltage value of the acquisition signal until the voltage value of the acquisition signal is not greater than a historical minimum voltage value; and determining the obtained superposition signal as a received signal for eliminating interference of the reception antenna, wherein the received signal for eliminating interference includes the useful signal.

In some embodiments, the communication device may be a base station or a terminal. The terminal can be, for example, a smart phone, a tablet computer, a desktop computer, a notebook computer, or a wearable device (such as a smart wristband, and smart glasses). The interference signal includes at least any of the following signals or a combination thereof: a self-interference signal, and a mutual interference signal.

In some embodiments, the first coupler 201 couples the radio transmission signal of the communication device so as to obtain the reference signal. The adjusting portion 202 adjusts the power and the phase of the reference signal to obtain the cancellation signal. The combiner 203 superimposes the cancellation signal obtained by the adjustment with the received signal received by the reception antenna of the communication device to obtain a superposition signal.

The received signal of the reception antenna of the communication device includes: 1) a useful signal; 2) an interference signal formed at the reception antenna by the transmitting signal. The second coupler 204 couples the obtained superposition signal so as to obtain the acquisition signal. The control portion 205 controls the adjustment module 202 to adjust the power and the phase of the reference signal according to the voltage value of the acquisition signal until the voltage value of the acquisition signal is not greater than the historical minimum voltage value.

At this time, the cancellation signal and the interference signal have the same power and opposite phases, and the cancellation signal and the received signal received by the reception antenna are superimposed, so that the cancellation signal can suppress and eliminate the interference signal formed by the transmission signal at the reception antenna.

In some embodiments, a part of signal power of the transmission antenna is coupled to be used as a reference signal, and the power and the phase of the reference signal are adjusted so that the cancellation signal obtained by the adjustment and the interference signal received by the reception antenna have opposite phases and the same power, and then the cancellation signal and the received signal are superimposed, thereby the purpose of eliminating the interference signal received by the MIMO reception antenna is achieved.

Taking the terminal using the 2×2 MIMO technology shown in FIG. 1 as an example, first, a part of the power of the transmission signal c of the transmit antenna A of the communication device is coupled as a reference signal, and by adjusting the power and the phase of the reference signal, a cancellation signal obtained by the adjustment and a self-interference signal g received by the reception antenna have opposite phases and the same power, and then the cancellation signal is superimposed with the received signal of the reception antenna A, thereby the purpose of eliminating the self-interfering signal g of the reception antenna A is achieved; and, by adjusting the power and the phase of the reference signal, the cancellation signal obtained by the adjustment and a mutual interference signal j of the reception antenna B have opposite phases and the same power, and then the cancellation signal is superimposed with the received signal of the reception antenna B, thereby an objective of reducing or eliminating the mutual interference signal j of the reception antenna B can be achieved.

Similarly, a part of the power of a transmission signal d of the transmission antenna B of the communication device is coupled to be used as a reference signal. By adjusting the power and the phase of the reference signal, the cancellation signal obtained by the adjustment and a mutual interference signal k of the reception antenna A have opposite phases and the same power, and then the cancellation signal is superimposed with the received signal of the reception antenna A, thereby the purpose of eliminating the mutual interference signal k of the reception antenna A is achieved; and by adjusting the power and the phase of the reference signal, the cancellation signal obtained by the adjustment and a self-interference signal h of the reception antenna B have opposite phases and the same power, and then the cancellation signal is superimposed with the received signal of the reception antenna B, thereby the purpose of eliminating the self-interference signal h of the reception antenna B is achieved.

Through the technical solution provided by the embodiment of the present disclosure, by adjusting the power and the phase of the reference signal which is obtained by coupling the transmission signal, the cancellation signal can suppress and eliminate the interference signal formed at the reception antenna by the transmission signal, thereby ensuring that the communication device can normally send and receive the receiving information and sending information, solving the problem of signal self-interference and mutual interference between multi-transmitting signals and multi-receiving signals of the communication device using full-duplex communication, and improving the communication quality of communication device; at the same time, the process of eliminating interference does not need man-made operation, a degree of intelligence is high; thus, the user experience can be improved.

Figure 3:
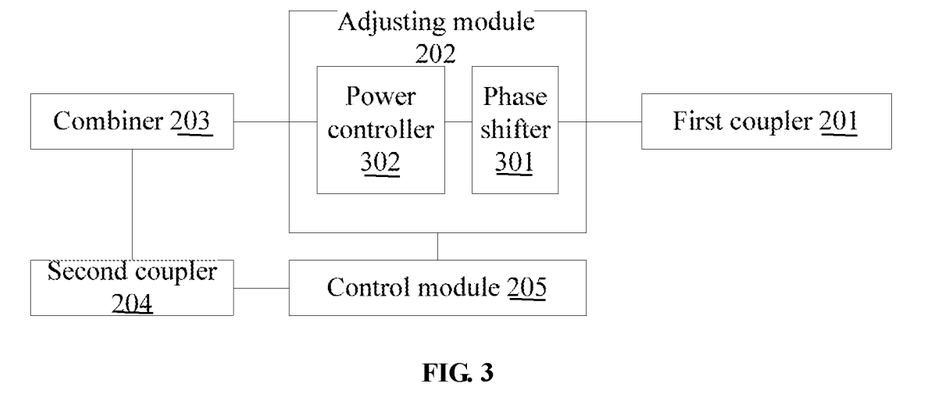
FIG. 3 is a block diagram of an apparatus for eliminating an interference signal according to some embodiments.

In some implementations, as shown in FIG. 3, the adjustment module 202 shown in FIG. 2 may include a phase shifter 301 and a power controller 302.

The phase shifter 301 is used for adjusting the phase of the reference signal.

The power controller 302 is connected with the phase shifter 301 for adjusting the power of the reference signal.

For example, the phase shifter may realize any angle of lead or lag phase shift in a range of 0-450 degrees.

According to some embodiment of the present disclosure, the phase shifter is used to adjust the power of the reference signal, and the power controller is used to adjust the power of the reference signal, so that the cancellation signal can suppress and eliminate the interference signal formed at the reception antenna by the transmission signal, thereby ensuring that the communication device can normally send and receive the received information and the sent information, solving the problem of signal self-interference and mutual interference between the multi-transmitted signals and multi-receiving signals of the communication device using full-duplex communication, and improving the communication quality of the communication device.

Figure 4:
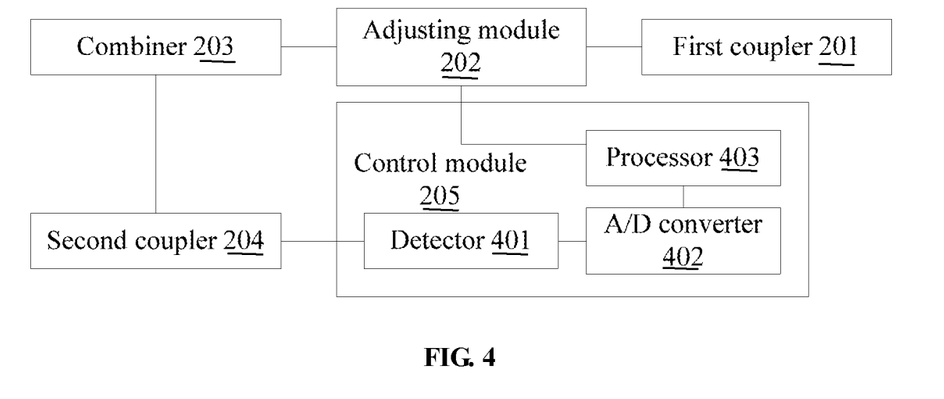
FIG. 4 is a block diagram of an apparatus for eliminating an interference signal according to some embodiments.

In some implementations, as shown in FIG. 4, the control portion 205 shown in FIG. 2 may include: a detector 401, an analog-to-digital (A/D) converter 402, and a processor 403.

The detector 401 is used for converting the acquisition signal into a voltage signal.

The analog-to-digital converter 402 is coupled to the detector 401 for converting the voltage signal into a digital signal.

The processor 403 is connected with the analog-to-digital converter 402 and the adjustment module, and is used for controlling the adjustment module to adjust the power and the phase of the reference signal according to the digital signal until the voltage value of the voltage signal is not greater than the historical minimum voltage value; and determining the superposition signal obtained by the combiner as a received signal for eliminating interference of the reception antenna; wherein the received signal for eliminating interference includes a useful signal.

According to some embodiments of the disclosure, the power and phase of the reference signal are adjusted by the adjusting portion under the control of the digital signal through the cooperation of the detector, the analog-to-digital converter and the processor, so that the cancellation signal can suppress and eliminate the interference signal formed by the transmission signal at the reception antenna, thereby ensuring that the communication device can normally send and receive the received information and the transmitted information.

Figure 5A:
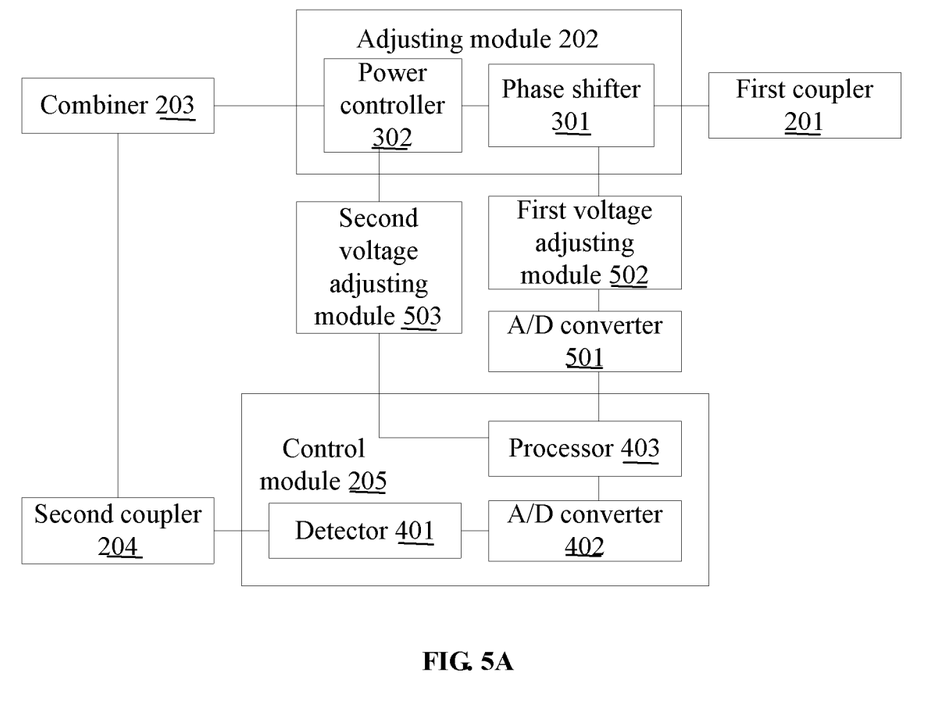
FIG. 5A is a block diagram of an apparatus for eliminating an interference signal according to some embodiments.

FIG. 5A is a block diagram of an apparatus for eliminating an interference signal according to some embodiments. Based on the foregoing apparatus embodiments, the apparatus for eliminating an interference signal shown in FIG. 5A may include: a first coupler 201, a phase shifter 301, a power controller 302, a combiner 203, a second coupler 204, a detector 401, an analog-to-digital converter 402, a processor 403, an analog-to-digital converter 501, a first voltage adjustment module 502, and a second voltage adjustment module 503.

The RF transmitting signal of the communication device is input to the first coupler 201, a small part of the power signal is coupled through the first coupler 201 as a reference signal b, and the remaining power of the RF transmitting signal enters the transmission antenna as the transmitting signal a and is transmitted to an opposite communication device. For example, the terminal sends a transmission signal to the base station and the reference signal is input to the phase shifter 301; the first voltage adjustment module 502 may output a voltage signal e of 0-13V, and the first voltage adjustment module 502 linearly controls the phase shifter to realize any angle of lead or lag phase shift within a range of 0-450 degrees. The first voltage adjustment module 502 may make a phase difference between the reference signal and the self-interference signal received by the reception antenna to be 180 degrees.

Next, the reference signal is input to the power controller 302, and a power gain is performed on the reference signal through the second voltage adjustment module 503. The second voltage adjustment module 503 may output a voltage f, adjust the power of the reference signal, and obtain a cancellation signal; then the cancellation signal is input to the combiner.

The received signal of the reception antenna includes a useful signal which is transmitted by the opposite communication device and received by the communication device, such as a useful signal of a downlink of the base station, and the received signal of the reception antenna also includes a self-interference signal of the transmission antenna of the communication device.

The received signal of the reception antenna and the cancellation signal are superposed and cancelled in the combiner, and a superposition signal is obtained after the superposition and cancellation. The superposition signal is input to the second coupler 204, and a small part of the power signal is obtained by coupling through the second coupler 204 as an acquisition signal.

The acquisition signal is input to the detector 401. The detector 401 converts the acquisition signal into a voltage signal. The voltage signal is converted through the analog-digital converter (A/D converter) 402 and then is input to the processor 403 (CPU). The processor 403 adjusts the phase of the reference signal through the analog-to-digital converter 501 and the first voltage adjustment module 502 according to the A/D converted voltage signal, and adjusts the power of the reference signal through the second voltage adjustment module 503, until an adjustment result of the reference signal corresponding to a set of control signals (e,f) is found.

As a result, the processor 403 detects that an output voltage value of the A/D converter 402 is the smallest, that is, the self-interference signal in the received signal of the reception antenna is eliminated in an analog domain. At this time, the cancellation signal and the self-interference signal have the same power in the analog domain, and their phases have a difference of 180 degrees.

Figure 5B:
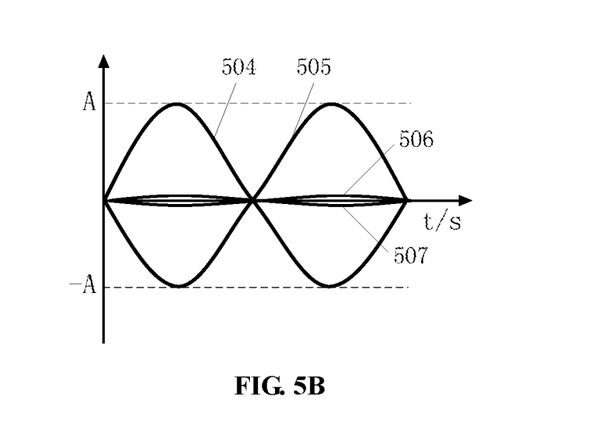
FIG. 5B is a schematic diagram illustrating a principle of eliminating an interference signal according to some embodiments.

Referring to FIG. 5B, an amplitude of the signal represents a power level. The cancellation signal 504 and the self-interference signal 505 have the same power in the analog domain, and a phase difference is 180 degrees. A power of a signal 506 or 507 obtained after the superposition and the cancellation between the cancellation signal 504 and the self-interference signal 505 in the combiner is relatively small; then, the remaining power of the superposition signal is input as a radio frequency received signal to the communication device.

According to some embodiments of the present disclosure, a part of the power of the transmission signal of the transmission antenna of the communication device is coupled to be used as a reference signal, and the power and the phase of the reference signal are adjusted, so that the cancellation signal obtained by the adjustment and the interference signal of the reception antenna have opposite phases and the same power, then the cancellation signal can suppress and eliminate the interference signal formed at the reception antenna by the transmission signal, thereby eliminating the interference signal caused by MIMO, realizing the full-duplex self-interference cancellation based on MIMO, ensuring the reliability of the full-duplex communication process between the terminal adopting the MIMO technology and the base station, and improving the communication quality of the communication device.

Based on the foregoing apparatus embodiments of the present disclosure, the following describes the method embodiments of the present disclosure.

Figure 6:
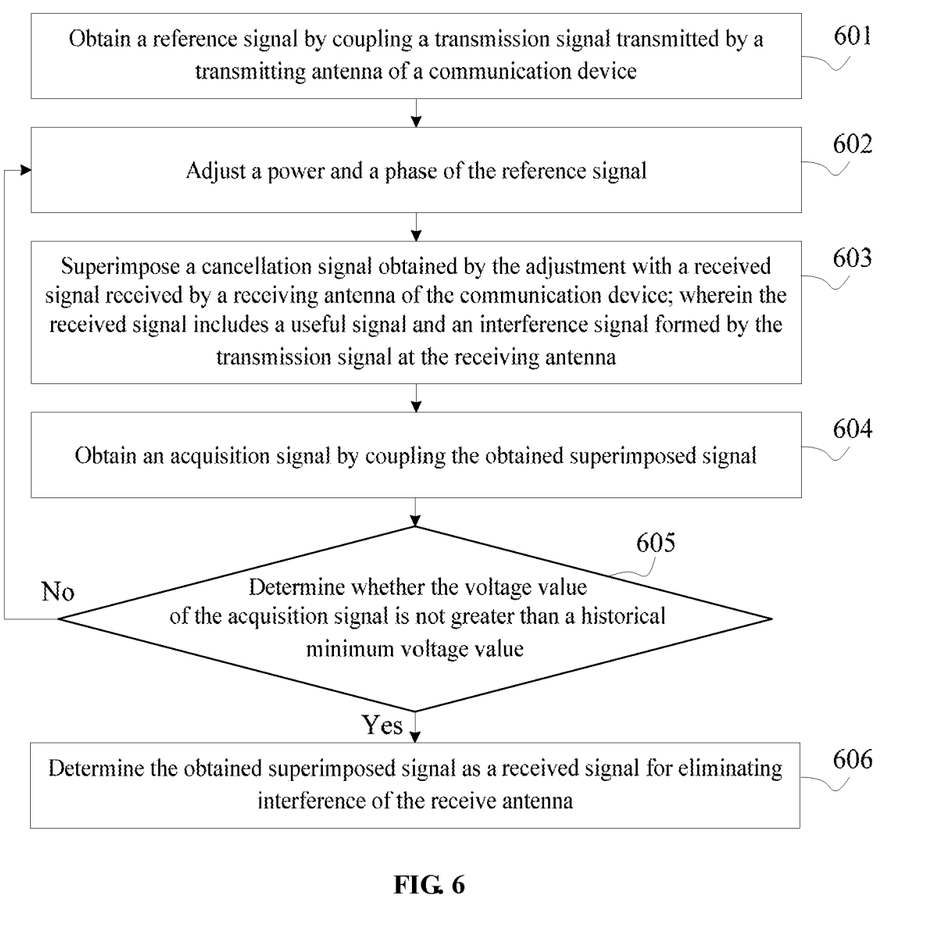
FIG. 6 is a flowchart of a method for eliminating an interference signal according to some embodiments.

FIG. 6 is a flowchart of a method for eliminating an interference signal according to some embodiments. The method may be applied to a communication device. As shown in FIG. 6, the method includes the following steps 601-606.

In step 601, a reference signal is obtained by coupling a transmission signal transmitted by a transmission antenna of a communication device.

For example, the communication device may be a base station or a terminal; the terminal is, for example, an electronic device such as a smart phone, a tablet, a desktop, a laptop, or a wearable device (such as a wristband, and smart glasses).

In step 602, a power and a phase of the reference signal are adjusted.

In step 603, a cancellation signal obtained by the adjustment is superimposed with a received signal received by a reception antenna of the communication device; wherein the received signal includes a useful signal and an interference signal formed by the transmitted signal at the reception antenna.

For example, the interference signal includes at least any one of the following signals or a combination thereof: a self-interference signal, or a mutual interference signal.

In step 604, an acquisition signal is obtained by coupling the obtained superposition signal.

For example, in step 602, the power and the phase of the reference signal may also be adjusted according to a voltage value of the acquisition signal.

In step 605, it is determined whether a voltage value of the acquisition signal is not greater than a historical minimum voltage value; when the voltage value of the acquisition signal is not greater than the historical minimum voltage value, the process goes to step 606; and when the voltage value of the acquisition signal is greater than the historical minimum voltage value, the process goes to step 602.

In step 606, the obtained superposition signal is determined as a received signal for eliminating interference of the reception antenna; wherein the received signal for eliminating interference includes the useful signal.

In the technical solution provided by the embodiments of the present disclosure, the power and the phase of the reference signal which is obtained by coupling the transmission signal are adjusted, so that the cancellation signal can suppress and eliminate the interference signal formed at the reception antenna by the transmission signal, thereby ensuring that the communication device may normally transmit and receive the receiving information and the transmission information, solving the problem of signal self-interference and mutual interference between multi-transmitting signals and multi-receiving signals of the communication device adopting the full-duplex communication, improving communication quality of the communication device, and improving the user experience.

The following are apparatus embodiments of the present disclosure and may be used to implement the method embodiments of the present disclosure.

Figure 7:
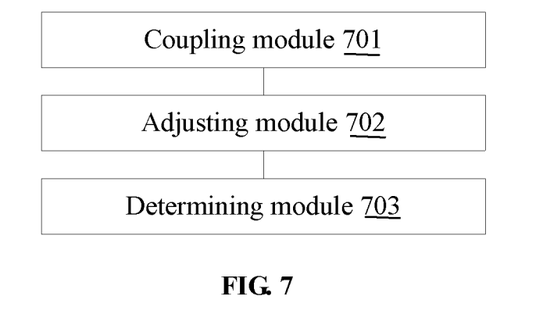
FIG. 7 is a block diagram of an apparatus for eliminating an interference signal according to some embodiments.

FIG. 7 is a block diagram of an apparatus for eliminating an interference signal according to some embodiments. The apparatus may be implemented in various ways, for example, all components of the apparatus are implemented in the communication device, or the components of the apparatus are implemented in a coupling manner at the communication device side. The apparatus may implement the above-mentioned method in the present disclosure through software, hardware or a combination thereof. As shown in FIG. 7, the apparatus for eliminating an interference signal includes: a coupling module or portion 701, an adjustment module or portion 702 and a determination module or portion 703.

The coupling module 701 is configured to couple a transmission signal transmitted by a transmission antenna of a communication device so as to obtain a reference signal.

The adjusting portion 702 is configured to adjust a power and a phase of the reference signal, superimpose a cancellation signal obtained by the adjustment with the received signal received by the reception antenna of the communication device, and obtain an acquisition signal by coupling the obtained superposition signal; and repeat this step until a voltage value of the acquisition signal is not greater than a historical minimum voltage value; wherein, the received signal includes a useful signal and an interference signal formed by the transmitted signal at the reception antenna.

The determining module 703 is configured to determine the obtained superposition signal as a received signal for eliminating interference of the reception antenna; wherein the received signal for eliminating interference includes the useful signal.

For example, the interference signal includes a self-interference signal or a mutual interference signal.

The apparatus provided in the embodiments of the present disclosure may be used to implement the technical solution of the embodiment shown in FIG. 6, and their implementation manner and advantageous effects are similar and are not described herein again.

In some implementations, the adjusting portion 702 adjusts the power and the phase of the reference signal according to a voltage value of the acquisition signal.

The apparatus configured to reduce or eliminate an interference signal according to some embodiments is provided below. The apparatus for eliminating an interference signal may be implemented in various ways. For example, all components of the apparatus may be implemented in the communication device, or the components of the apparatus may be implemented in a coupling manner at the communication device side. The apparatus for eliminating an interference signal includes:

a processor;

a memory for storing instructions executable by the processor;

wherein the processor is configured to:

couple a transmission signal transmitted from a transmission antenna of a communication device so as to obtain a reference signal;

adjust a power and a phase of the reference signal, superimpose a cancellation signal obtained by the adjustment with a received signal received by a reception antenna of the communication device, and couple the obtained superposition signal so as to obtain an acquisition signal; and repeat this step until a voltage value of the acquisition signal is smaller than or equal to a historical minimum voltage value, the received signal comprising a useful signal and an interference signal formed by the transmission signal at the reception antenna; and determine the obtained superposition signal as a received signal for eliminating interference of the receive antenna, the received signal for eliminating interference of the receive antenna including the useful signal.

In one embodiment, the interference signal includes: a self-interference signal, or a mutual interference signal.

In one embodiment, the processor may be further configured to adjust a power and a phase of the reference signal according to a voltage value of the acquisition signal.

Figure 8:
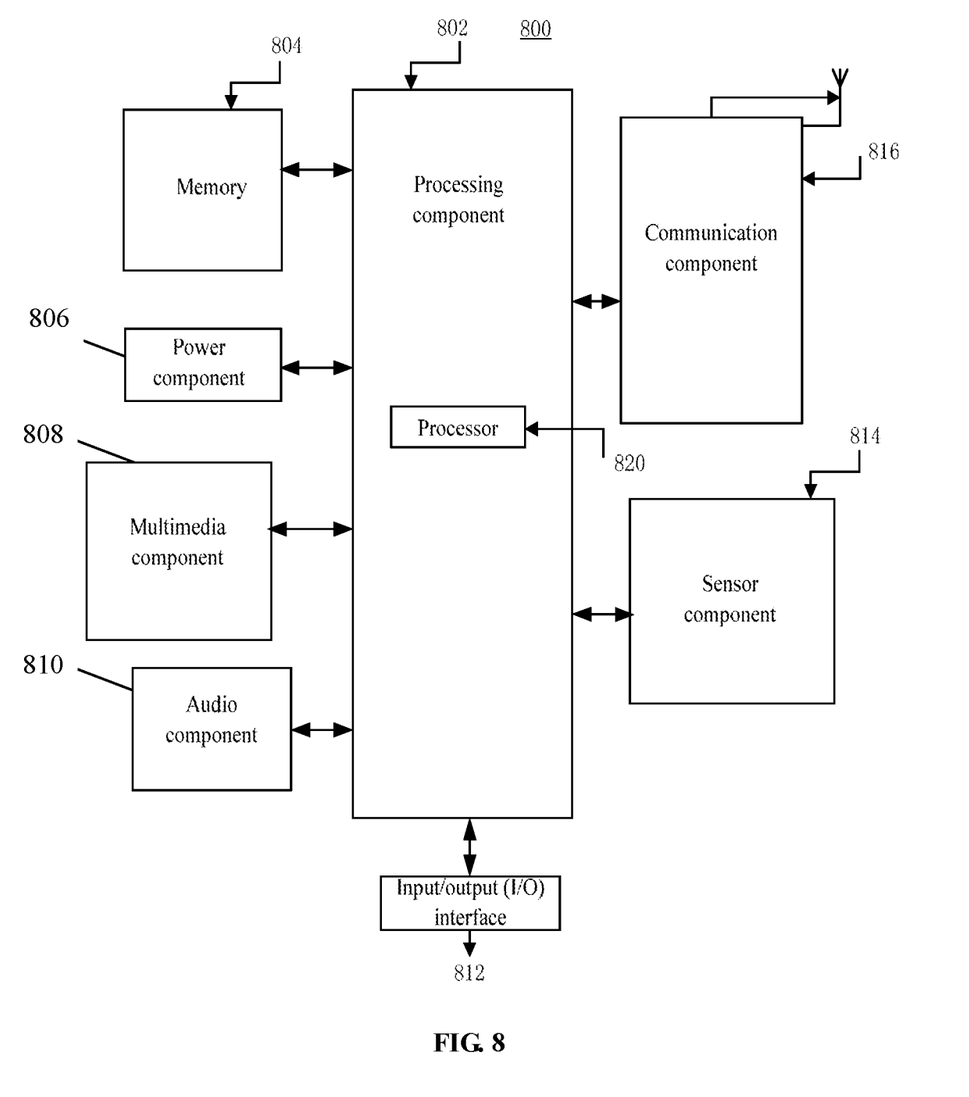
FIG. 8 is a block diagram of an apparatus for eliminating an interference signal according to some embodiments.

FIG. 8 is a block diagram of an apparatus for eliminating an interference signal provided by some embodiments of the present disclosure. For example, the apparatus 800 may be a mobile phone, a computer, a digital broadcast terminal, a messaging device, a gaming console, a tablet, a medical device, exercise equipment, and the like.

Referring to FIG. 8, the apparatus 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the apparatus 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the apparatus 800. Examples of such data include instructions for any applications or methods operated on the apparatus 800, contact data, phonebook data, messages, pictures, video, etc. The memory 804 may be implemented using any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the apparatus 800. The power component 806 may include a power management system, one or more power sources, and any other components associated with the generation, management, and distribution of power in the apparatus 800.

The multimedia component 808 includes a screen providing an output interface between the apparatus 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel.

The touch sensors may not only sense a boundary of a touch or swipe action, but also sense a period of time and a pressure associated with the touch or swipe action. In some embodiments, the multimedia component 808 includes a front camera and/or a rear camera. The front camera and/or the rear camera may receive an external multimedia datum while the apparatus 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the device 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like.

The buttons may include, but are not limited to, a home button, a volume button, a starting button, and a locking button.

The sensor component 814 includes one or more sensors to provide status assessments of various aspects of the apparatus 800. For instance, the sensor component 814 may detect an open/closed status of the apparatus 800, relative positioning of components, e.g., the display and the keypad, of the apparatus 800, a change in position of the apparatus 800 or a component of the apparatus 800, a presence or absence of user contact with the apparatus 800, an orientation or an acceleration/deceleration of the apparatus 800, and a change in temperature of the apparatus 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the apparatus 800 and other devices. The apparatus 800 can access a wireless network based on a communication standard, such as WiFi, 2G or 3G or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the apparatus 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, there is also provided a non-transitory computer-readable storage medium including instructions, such as the memory 804 including instructions, the above instructions are executable by the processor 820 in the device 800, for performing the above-described resource transfer methods. For example, the non-transitory computer-readable storage medium may be a ROM, a RAM, a CD-ROM, a magnetic tape, a floppy disc, an optical data storage device, and the like.

Figure 9:
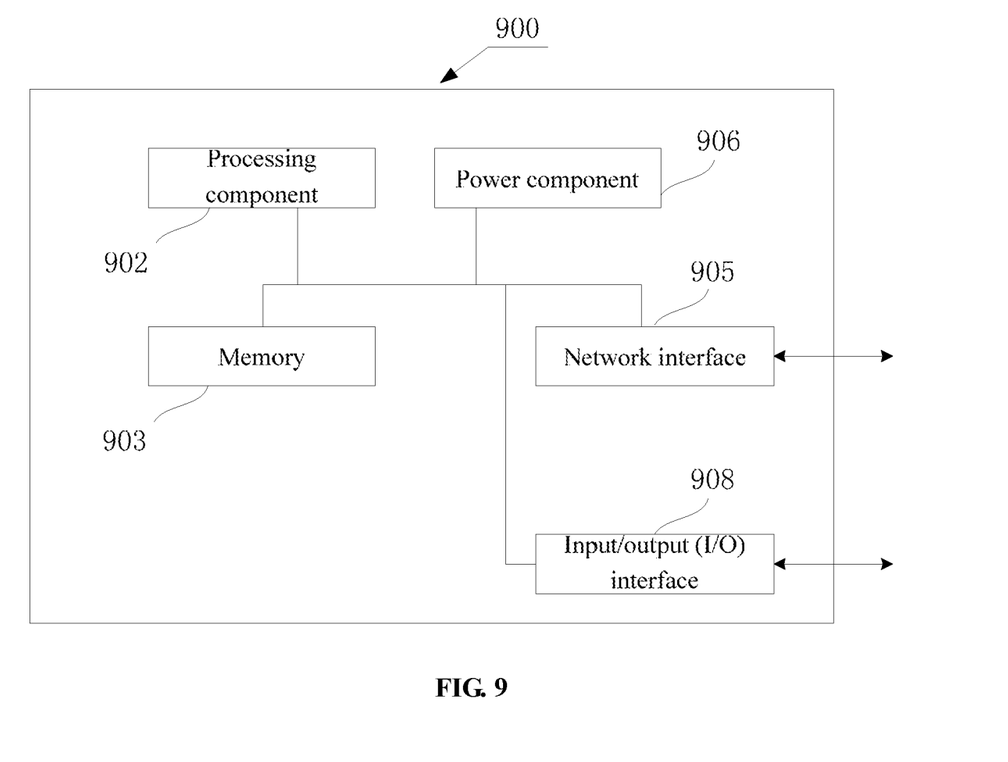
FIG. 9 is a block diagram of an apparatus configured to reduce or eliminate an interference signal according to some embodiments.

FIG. 9 is a block diagram of an apparatus 900 configured to eliminate or reduce an interference signal according to some embodiments. For example, the apparatus 900 may be provided as a server. The apparatus 900 includes a processing component 902 that further includes one or more processors, and memory resources represented by a memory 903 for storing instructions executable by the processing component 902, such as application programs. The application programs stored in the memory 903 may include one or more modules each corresponding to a set of instructions. Further, the processing component 902 is configured to execute the instructions to perform the above described methods.

The apparatus 900 may also include a power component 906 configured to perform power management of the apparatus 900, wired or wireless network interface(s) 905 configured to connect the apparatus 900 to a network, and an input/output (I/O) interface 908. The apparatus 900 may operate based on an operating system stored in the memory 903, such as Windows Server™, Mac OS X™, Unix™, Linux™, FreeBSD™, or the like.

A non-transitory computer readable storage medium, when instructions in the storage medium is executed by the processor of the apparatus 800 or the apparatus 900, enables the apparatus 800 or the apparatus 900 to perform the method for eliminating an interference signal, the method including:

coupling a transmission signal transmitted from a transmission antenna of a communication device so as to obtain a reference signal;

adjusting a power and a phase of the reference signal, superimposing a cancellation signal obtained by the adjustment with a received signal received by a reception antenna of the communication device, and coupling the obtained superposition signal so as to obtain an acquisition signal; and repeating this step until a voltage value of the acquisition signal is smaller than or equal to a historical minimum voltage value, the received signal comprising a useful signal and an interference signal formed by the transmission signal at the reception antenna; and determining the obtained superposition signal as a received signal for eliminating interference of the receive antenna, the received signal for eliminating interference of the receive antenna comprising the useful signal.

In some embodiments, the interference signal includes a self-interference signal or a mutual interference signal.

In some embodiments, the adjusting the power and the phase of the reference signal includes: adjusting the power and the phase of the reference signal according to a voltage value of the acquisition signal.

Various embodiments of the present disclosure can have one or more of the following advantages: the power and the phase of the reference signal can be obtained by coupling the transmission signal and adjusted, such that the cancellation signal can suppress and reduce or eliminate the interference signal formed at the reception antenna by the transmission signal, so as to ensure that the communication device can normally receive and transmit. The signal self-interference and mutual interference problems existing between the multi-transmitting signals and the multi-receiving signals of the communication device using the full-duplex communication can also be reduced or eliminated. The communication quality of the communication device can be improved. Meanwhile, no manual operation is needed during the reduction or elimination of the interference. Rather, the operation is highly automated with a degree of intelligence, and the user experience is improved.

The terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

In some embodiments, the control and/or interface software or app can be provided in a form of a non-transitory computer-readable storage medium having instructions stored thereon is further provided. For example, the non-transitory computer-readable storage medium may be a ROM, a RAM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. An apparatus configured to reduce or eliminate an interference signal, the apparatus comprising: a first coupler, an adjusting portion, a combiner, a second coupler, and a control portion, wherein:
   the first coupler is coupled to a transmission antenna of a communication device, and is configured to couple a transmission signal transmitted by the transmission antenna of the communication device so as to obtain a reference signal;
   the adjusting portion is coupled to the first coupler and configured to adjust a power and a phase of the reference signal to obtain a cancellation signal;
   the combiner is coupled to the adjusting portion and a reception antenna of the communication device respectively, and is configured to superimpose the cancellation signal obtained by the adjustment with a received signal received by the reception antenna of the communication device to obtain a superposition signal, the received signal comprising a useful signal and an interference signal formed by the transmission signal at the reception antenna;
   the second coupler is coupled to the combiner and configured to couple the obtained superposition signal so as to obtain a small part of power signal as an acquisition signal; and
   the control portion is coupled to the second coupler and the adjusting portion respectively, and configured to:
   control the adjusting portion to adjust the power and the phase of the reference signal according to a voltage value of the acquisition signal until the voltage value of the acquisition signal is smaller than or equal to a historical minimum voltage value; and
   determine the obtained superposition signal as a received signal for reducing or eliminating interference of the reception antenna, the received signal for reducing or eliminating interference comprising the useful signal;
   wherein the control portion comprises:
   a detector, an analog-to-digital converter, and a processor, wherein:
   the detector is configured to convert the acquisition signal into a voltage signal;
   the analog-to-digital converter is coupled to the detector and is configured to convert the voltage signal into a digital signal; and
   the processor is coupled to the analog-to-digital converter and the adjusting portion, and configured to:
   control the adjusting portion to adjust the power and the phase of the reference signal according to the digital signal until the voltage value of the voltage signal is smaller than or equal to the historical minimum voltage value; and
   determine the superposition signal obtained by the combiner as the received signal for eliminating interference of the reception antenna comprising the useful signal;

wherein the processor is further configured to adjust the phase of the reference signal through the analog-to-digital converter and a first voltage adjustment module according to the A/D converted voltage signal, and adjust the power of the reference signal through a second voltage adjustment module, until an adjustment result of the reference signal corresponding to a set of control signals is found.

2. The apparatus according to claim 1, wherein the adjusting portion comprises: a phase shifter and a power controller, wherein:

the phase shifter is configured to adjust the phase of the reference signal; and the power controller is coupled to the phase shifter and configured to adjust the power of the reference signal.

3. The apparatus according to claim 1, wherein the interference signal comprises at least one of a self-interference signal or a mutual interference signal.

4. A method for reducing or eliminating an interference signal, comprising:

coupling a transmission signal transmitted from a transmission antenna of a communication device so as to obtain a reference signal;

adjusting a power and a phase of the reference signal, superimposing a cancellation signal obtained by the adjusting with a received signal received by a reception antenna of the communication device, and coupling the obtained superposition signal so as to obtain a small part of power signal as an acquisition signal; and repeating the adjusting until a voltage value of the acquisition signal is smaller than or equal to a historical minimum voltage value, the received signal comprising a useful signal and an interference signal formed by the transmission signal at the reception antenna; and determining the obtained superposition signal as a received signal for eliminating interference of the receive antenna, the received signal for eliminating interference of the receive antenna comprising the useful signal;

the method further comprising:

converting the acquisition signal into a voltage signal;

converting the voltage signal into a digital signal;

controlling an adjusting portion to adjust the power and the phase of the reference signal according to the digital signal until a voltage value of the voltage signal is smaller than or equal to a historical minimum voltage value;

determining the superposition signal obtained by a combiner as the received signal for eliminating interference of the reception antenna comprising the useful signal;

adjusting the phase of the reference signal through an analog-to-digital converter and a first voltage adjustment module according to an A/D converted voltage signal; and adjusting the power of the reference signal through a second voltage adjustment module, until an adjustment result of the reference signal corresponding to a set of control signals is found.

5. The method according to claim 4, wherein the interference signal comprises at least one of a self-interference signal or a mutual interference signal.

6. An apparatus configured to reduce or eliminate an interference signal, comprising:

a processor;

memory storing instructions executable by the processor;

wherein the processor is configured to:

couple a transmission signal transmitted from a transmission antenna of a communication device so as to obtain a reference signal;

adjust a power and a phase of the reference signal, superimpose a cancellation signal obtained by the adjustment with a received signal received by a reception antenna of the communication device, and couple the obtained superposition signal so as to obtain a small part of power signal as an acquisition signal; and repeat the adjusting a power and a phase of the reference signal, superimposing a cancellation signal obtained by the adjustment with a received signal received by a reception antenna of the communication device, and coupling the obtained superposition signal so as to obtain an acquisition signal until a voltage value of the acquisition signal is smaller than or equal to a historical minimum voltage value, the received signal comprising a useful signal and an interference signal formed by the transmission signal at the reception antenna; and determine the obtained superposition signal as a received signal for eliminating interference of the receive antenna, the received signal for eliminating interference of the receive antenna comprising the useful signal;

wherein the processor is coupled to the analog-to-digital converter and the adjusting portion, and configured to:

control an adjusting portion to adjust the power and the phase of the reference signal according to a digital signal converted from the voltage signal until a voltage value of the voltage signal is smaller than or equal to a historical minimum voltage value; and determine the superposition signal obtained by a combiner as the received signal for eliminating interference of the reception antenna comprising the useful signal;

wherein the processor is further configured to adjust the phase of the reference signal through the analog-to-digital converter and a first voltage adjustment module according to the A/D converted voltage signal, and adjust the power of the reference signal through a second voltage adjustment module, until an adjustment result of the reference signal corresponding to a set of control signals is found.

7. The apparatus according to claim 6, wherein the interference signal comprises at least one of a self-interference signal or a mutual interference signal.

8. The apparatus of claim 6, wherein the instructions comprise:

coupling the transmission signal transmitted from the transmission antenna of the communication device so as to obtain a reference signal;

adjusting the power and the phase of the reference signal, superimposing the cancellation signal obtained by the adjusting with the received signal received by a reception antenna of the communication device, and coupling the obtained superposition signal so as to obtain the acquisition signal; and repeating the adjusting until the voltage value of the acquisition signal is smaller than or equal to the historical minimum voltage value, the received signal comprising a useful signal and an interference signal formed by the transmission signal at the reception antenna; and determining the obtained superposition signal as the received signal for eliminating interference of the receive antenna, the received signal for eliminating interference of the receive antenna comprising the useful signal.

9. The apparatus according to claim 8, wherein the interference signal comprises at least one of a self-interference signal or a mutual interference signal.

10. The apparatus according to claim 8, wherein the adjusting the power and the phase of the reference signal comprises:
   adjusting the power and the phase of the reference signal according to a voltage value of the acquisition signal.

* * * * *